United States Patent [19]

Fogle et al.

[11] Patent Number: 4,726,831

[45] Date of Patent: Feb. 23, 1988

[54] MOLTEN GLASS DELIVERY AND CONDITIONING SYSTEM

[75] Inventors: Ronald D. Fogle, Corning; Ashok L. Nayak, Big Flats, both of N.Y.

[73] Assignee: Corning Glass Works, Corning, N.Y.

[21] Appl. No.: 2,578

[22] Filed: Jan. 12, 1987

[51] Int. Cl.⁴ ............................................. C03B 7/06
[52] U.S. Cl. .................................. 65/136; 65/128; 65/135; 65/326; 65/346; 65/347
[58] Field of Search ............... 65/128, 135, 136, 326, 65/337, 346, 347

[56] References Cited

U.S. PATENT DOCUMENTS

| 3,206,295 | 9/1965 | Mattern | 65/346 X |
| 3,248,206 | 4/1966 | Apple et al. | 65/347 |
| 3,303,011 | 2/1967 | Fukuzaki | 65/128 X |
| 3,410,675 | 11/1968 | Dockerty | 65/326 |
| 4,029,887 | 6/1977 | Spremulli | 13/6 |
| 4,143,232 | 3/1979 | Bansal et al. | 13/6 |
| 4,352,687 | 10/1982 | Boettner | 65/134 |
| 4,365,986 | 12/1982 | Nayak | 65/136 |
| 4,365,987 | 12/1982 | Boettner | 65/137 |

*Primary Examiner*—Arthur Kellogg
*Attorney, Agent, or Firm*—Alfred L. Michaelsen

[57] ABSTRACT

A glass delivery system is disclosed which includes a molybdenum delivery pipe surrounded by molten glass and inductively heated by a water cooled induction heating coil surrounding the molybdenum pipe and spaced apart therefrom by means of refractory material.

10 Claims, 4 Drawing Figures

MOLTEN GLASS DELIVERY AND CONDITIONING SYSTEM

BACKGROUND OF THE INVENTION

This invention relates to a delivery system for conveying and conditioning molten thermoplastic material, such as molten glass, from a source of such material, such as a melting furnace, to a desired outlet position, such as adjacent forming apparatus. In its preferred form, the invention pertains to a forehearth for the delivery of molten glass from a furnace wherein the molten glass is conveyed through a refractory metal conduit and is simultaneously conditioned to a desired relatively uniform temperature and viscosity by means of a heat exchange device for efficiently and economically providing heat to and removing heat from the molten glass as required, as it passes therethrough. The conduit may be immersed in, or surrounded by, stagnant glass. Water cooled inductive heating means is located about the conduit in intimate contact with refractory material positioned about the conduit to provide uniform heat input into the glass within the conduit while maintaining a relatively cool exterior refractory surface.

Although by no means limited to such use, the present invention has particular applicability for use with vertically oriented electric glass melting furnaces such as disclosed in U.S. Pat. Nos. 4,029,887, and 4,143,232. Similar delivery systems have in fact been utilized with such vertical melting furnaces as shown in U.S. Pat. Nos. 4,352,687, 4,365,986 and 4,365,987. U.S. Pat. No. 4,365,987 is similar to U.S. Pat. No. 4,352,687 patent but with the inclusion of a flow control means for regulating flow through the delivery conduit.

The glass delivery system disclosed in U.S. Pat. No. 4,352,687 includes a refractory metal pipe or conduit enclosed within a refractory structure for conveying molten glass. The refractory structure is spaced about the pipe and defines a closed space which receives a quantity of the glass so as to surround the outer periphery of the pipe with such glass. Heat input devices, in the form of molybdenum mesh electric heaters, are positioned within the closed space for supplying heat to the pipe. In addition separate cooling means are provided for removing heat energy given up by the glass delivered through the pipe.

The delivery systems disclosed in Pat. Nos. 4,365,986 and 4,352,687 have not been completely satisfactory, since the molybdenum mesh heaters are subject to corrosion and oxidation failure. Without the availability of the heat supplied by such molybdenum mesh heaters, the delivery systems set forth in such patents cannot be relied upon to maintain desired glass temperatures in normal operations, or an ability for the glass to soak at temperature, or the ability to be cooled down and brought back up to an operating temperature.

Unlike the delivery systems disclosed in U.S. Pat. Nos. 4,365,986 and 4,352,687, the water cooled inductive system of the present invention does not require power feed throughs or power feed through thermocouples, or the associated purge lines. The refractory construction of the present invention is less voluminous, since the pipe-to-refractory cavity can be several inches tighter, and the refractory thickness can be minimized since the water-cooled inductive coils provide a positive barrier to glass leakage by setting up a large temperature gradient across the refractory. In addition, the cooling rate obtainable with U.S. Pat. No. 4,352,687 the delivery system can be increased by the present system since the refractory sections are thinner and the water cooled induction coils are in intimate contact with the refractory. It is also felt that the induction heated system is more reliable than the mesh heater powered system of U.S. Pat. No. 4,352,687.

SUMMARY OF THE INVENTION

In its simplest form, the present invention sets forth an improved delivery system for conveying molten thermoplastic material, such as glass, from a source thereof to a delivery point while thermally conditioning the same. The glass is conveyed within a refractory metal pipe which is surrounded by a refractory structure located so as to form a closed space between the pipe and inner refractory walls of such structure. Water-cooled inductive heating coils are provided about the refractory structure in intimate contact with outer surfaces thereof. The temperature response of the molten glass passing through the refractory metal pipe is very rapid since the pipe is inductively heated by the coils with electromagnetic fields which act with the speed of light, and the refractory metal pipe itself has very good thermal conductivity. Further, since the coils are water cooled and in intimate contact with the refractory, which itself is relatively thin and in close coupling with the refractory metal pipe, heat transfer rates substantially greater than that obtained by the noted prior art patents can be achieved.

DESCRIPTION OF THE PREFERRED EMBODIMENTS

Figure 1:
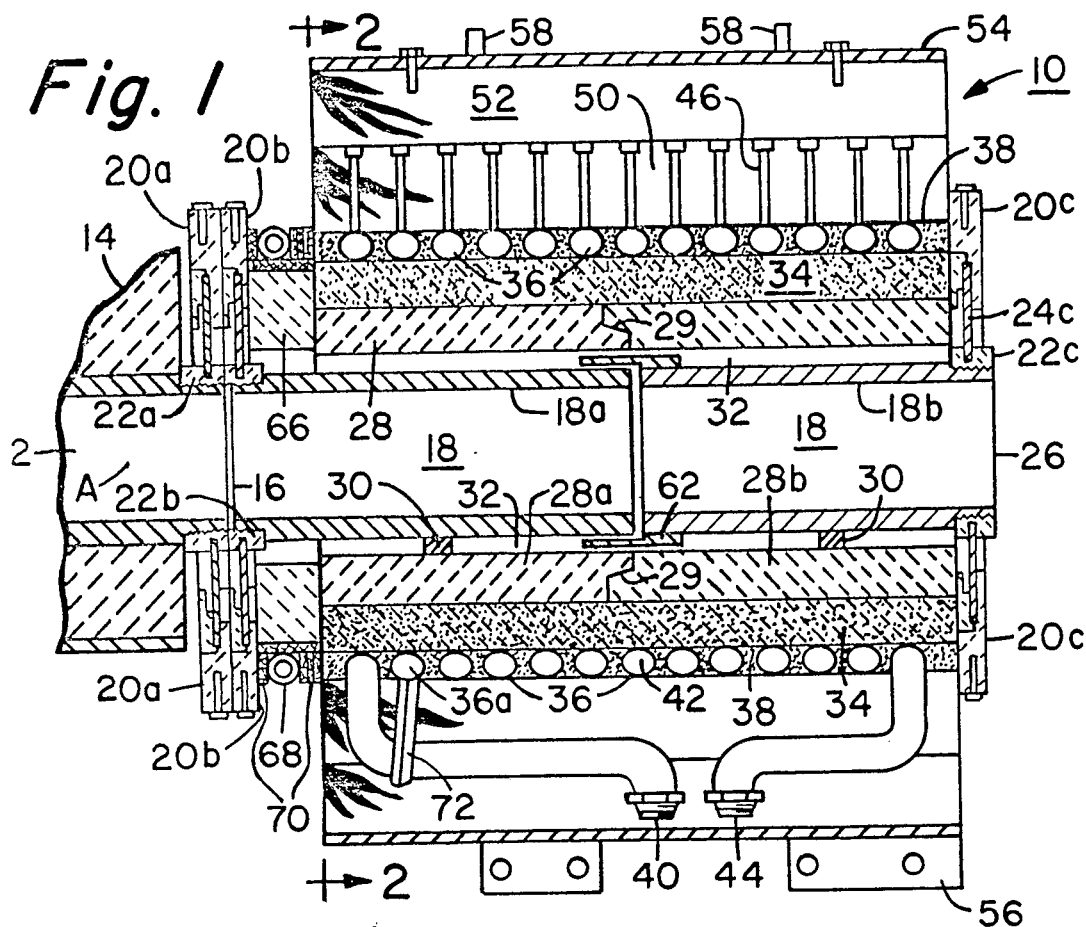
FIG. 1 is a sectional view of a delivery and conveying system of the present invention taken along line 1—1 of FIG. 2, and schematically illustrating a furnace outlet connected thereto.
Figure 3:
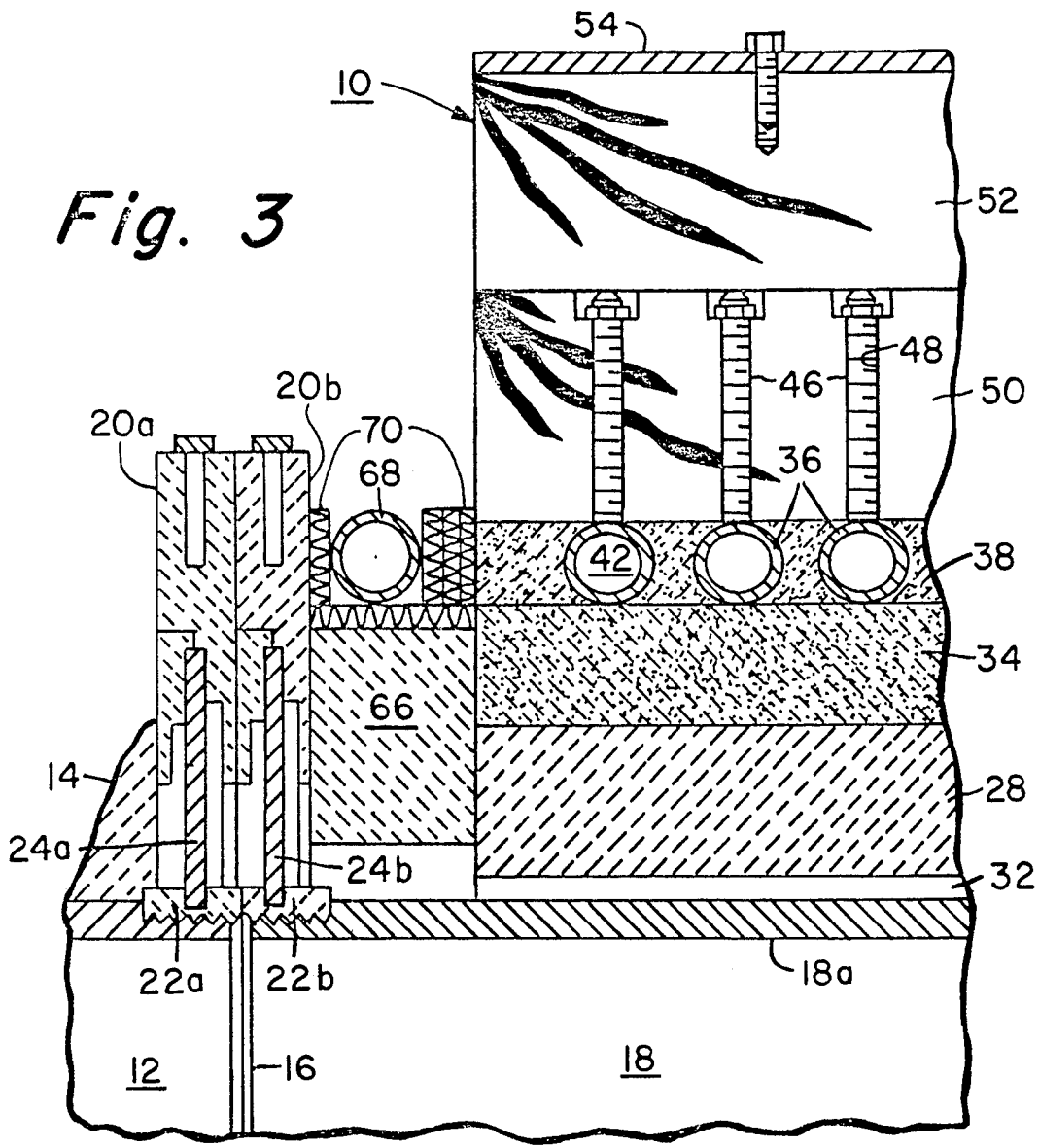
FIG. 3 is an enlarged fragmental sectional view of the inlet end of the delivery system.

Referring now to the drawings, and particularly FIGS. 1 and 3, a delivery and conditioning system 10 is shown connected to an outlet conduit 12 of a source of molten glass such as a glass tank 14. The outlet conduit 12 is connected to and communicates with the inlet end 16 of a refractory metal delivery pipe 18, positioned centrally of the delivery and conditioning system 10. Although other refractory metals may be utilized, the delivery pipe 18 is preferably formed of molybdenum and may include a plurality of sections 18a, 18b, etc., which are joined together as set forth hereinafter to form a flow path of desired length for the molten glass. A pair of water cooled flange assemblies 20a, 20b have threaded locking rings 22a, 22b (see FIG. 3) for threadably receiving the end of outlet conduit 12 and the inlet end 16 of delivery pipe 18, respectively. A molybdenum plate 24a, 24b is positioned within each of the water cooled flange assemblies to effectively seal the flow of any molten glass which may be exterior of the pipe 18. The outlet end 26 of the delivery pipe 18 is provided with a similar water cooled flange assembly 20c having a threaded locking ring 22c and a molybdenum plate 24c (see FIG. 1).

The molybdenum delivery pipe 18 is surrounded by a refractory sleeve 28 which is spaced from the pipe by means of spacers or shims 30 to form a cavity or space 32 about the outer periphery of the pipe 18 and about the flow path through the pipe. The spacers 30 are also used to support the moly pipe 18. The refractory sleeve 28 may be formed in a plurality of sections 28a, 28b, etc., depending upon the desired length of the delivery system, and joined together by offset joints 29 which prevent or inhibit the flow of molten glass therebetween. The refractory sleeve sections may be made of any suitable material such as zircon, zac or alumina refractories.

A castable blend refractory material 34, such as zirconia cement, may be formed about the outer periphery of the refractory sleeve sections 28. A water cooled induction heating coil 36 is positioned about the outer periphery of the castable refractory material 34 and may be embedded in or encased by a suitable refractory material 38 such as alumina cement. The cement of the coils 36, should have good thermal conductivity to improve the cooling effectiveness. The induction heating coil 36 has an inlet end or power supply lead 40 for both supplying cooling fluid, such as water, to the hollow passageway 42 extending through the coil, and power for energizing the coil, and an exit end 44 for removing the cooling fluid from the coil and for completing the electrical connection to the coil.

Each of the turns 36a, etc. of the coil 36 is held in intimate contact with the refractory 34 and in spaced apart relationship to its adjacent turn, by means of studs 46 braised to each turn of the coil 36, and each stud extending through a recess 48 in a coil support member 50. A spacer 52 for each coil support member 50 positions the coils with respect to an outer enclosing shell 54. The shell has clamping flanges 56 for securing upper and lower halves of the shell together, and annular strengthening ribs 58. The support member 50 and spacer 52 may be of wood, and may have a support tab 60 along side portions thereof.

Figure 2:
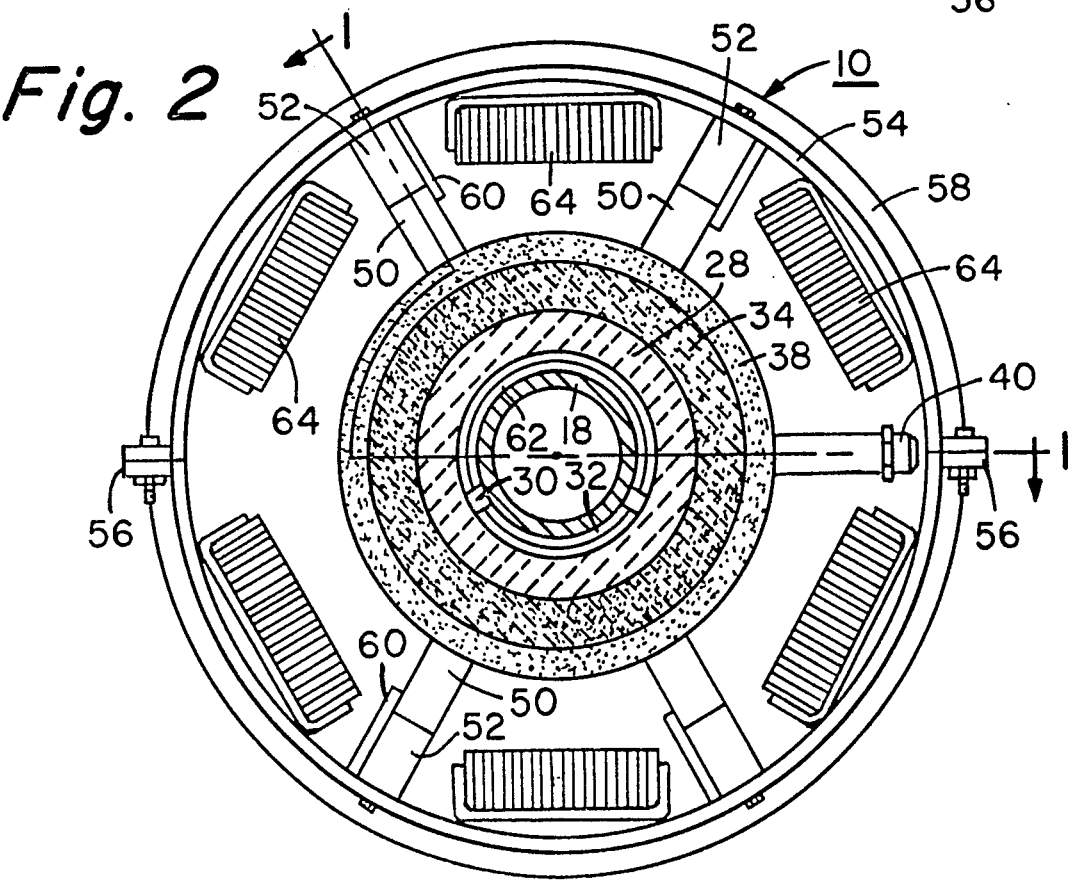
FIG. 2 is a cross-sectional view in elevation taken along line 2—2 of FIG. 1.

As previously mentioned, the shims or spacers 30 position the pipe 18 within the cavity 32. As shown in FIG. 2, the shims are positioned near the bottom of the pipe, but about 60° on each side of the vertical center line. In view of the fact that the molybdenum delivery pipe expands differently from the surrounding refractory, the shims permit the pipe to slide horizontally with respect to the refractory and compensate for such differential expansion. In addition, the various sections 18a, 18b, etc. (depending upon the desired length of the delivery system) are connected together by a slip joint 62. The joint 62 is secured to one end of a pipe section, with the adjacent end freely slidable therewithin to accommodate expansion and contraction of the pipe sections. Further, the slip joint 62 facilitates a limited flow of molten glass from the flow path within the delivery pipe or conduit 18 into the spece or cavity 32 surrounding the outer periphery of the delivery pipe so as to protect the molybdenum pipe from oxidation. In addition, the shims 30 and the slip joints 62 are also preferrably formed of molybdenum and are protected from oxidation by the molten glass within the cavity 32. As previously mentioned, molybdenum plates 24a, 24b, 24c function as a barrier or seal to keep the glass exteriorly of pipe 18 from flowing outwardly from cavity 32. The flange assemblies 20a–20c are water cooled which functions to freeze and seal any leakage paths thereabout.

As noted in FIG. 2, a plurality of shunts 64 extend longitudinally along the delivery system 10 within the outer shell 54 and between the spacers 52. The shunts 64 are made of silica iron and each absorbs the flux produced by the induction coil 36 to prevent overheating of the steel casing 54. The shunts may be water cooled to remove excess heat is desired, and if it were not for the shunts, the steel casing may become overheated.

A ring block 66 is positioned between water cooled flange assembly 20b and end portions of refractory sleeve 28 and refractory material 34. A Faraday ring 68 circumscribes the outer periphery of the ring block 66 and is insulated from the surrounding structure by suitable refractory material 70 such as ceramic fiber made from alumina and silica sold under the trademark Fiberfrax ® by the Carborundum Company. The Faraday ring 68 is utilized to capture the flux from the coil 36 so as to prevent the coil from overheating the structural steel of the furnace and the flange assemblies 20a, 20b. It is important, however, that sufficient heat be supplied by the coil 36 to point "A" in the outlet conduit 12 from the glass tank or furnace 14, for flow during start up or during idling periods, but without heating the molybdenum/stainless steel interface in the flange assemblies above the oxidation temperature (i.e. approximately 700° C.) of the molybdenum. As a practical matter, as much heat as desired may be applied by the coil 36 to the delivery pipe 18, and since the refractory metal pipe 18 has very good thermal conductivity, glass at point A within outlet conduit 12, will heat up by conduction along pipes 18 and 12. The water cooled copper Faraday ring 68 functions to absorb or short out inductive flux to the stainless steel flange assemblies 20a, 20b and adjacent structural steel, and thus prevent the steel from being overheated by the coil 36. The Faraday ring 68 may be of a split construction so that it may be easily removable during normal operations so as to avoid excessive heat loss.

As an alternative method of preventing the overheating of adjacent steel, linkage tabs or shorting bars 72 may be connected between one or more coil turns 36a, etc., near the inlet end 16 of pipe 18, and the inlet or power supply lead 40 so as to temporarily short out the end of the coil 36 adjacent the flange assemblies 20a, 20b. Accordingly, the shorting bars 72 remove power from the inlet end of the coil near the flanges 20a, 20b, while the adjacent turns of the coil provide sufficient flux to heat the pipe 18. Heat from the pipe is transferred by conduction to provide the necessary heat at point A adjacent the exit end of the furnace, while the overheating of the flange assemblies and adjacent supporting steel structure is prevented by the shorted-out coil turns. It is understood, of course, that the shorting bars 72 are conveniently connected and disconnected between the power inlet lead 40 and the desired turns 36a as may be required, so as to prevent excess heating of the flange assemblies. Further, to obtain increased heating of the delivery pipe 18 near inlet end 16 so as to increase the amount of heat applied to the glass at point A being delivered by the outlet conduit 12 from the glass tank 14, coil turns 36a etc. adjacent the end of the coil 36 close to flange assemblies 20a, 20b, could be more tightly coupled to the conduit, thus providing more heat at the inlet end of the pipe while not overheating the flange assemblies.

Water cooling is applied to the induction heating coil 36 through inlet end 40, and circulates through the various turns 36a, etc. via hollow passageway 42, and exits through the outlet end 44. The inlet connection 40 and outlet connection 44 also carry the current for generating the inductive flux, and being water cooled, the coil can operate at very high currents without deleterious effects. The control of the heat supplied to the delivery pipe 18 is regulated by the power supplied to the coil, and the power may be controlled automatically using a thermocouple. The turns 36a, etc. of the coil 36 may be wrapped in a fiberglass insulation to protect the adjacent turns from shorting to each other, prior to the application of the alumina cement 38 which surrounds the coil area.

Figure 4:
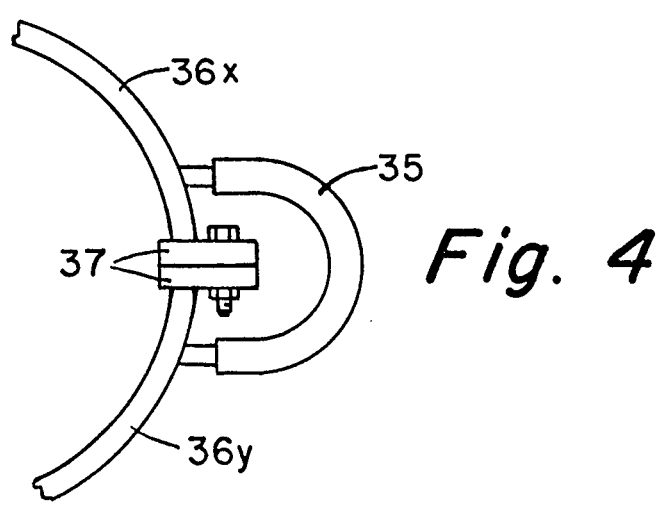
FIG. 4 is a fragmental schematic view of a further embodiment.

Although only two sections 18a, 18b of the refractory metal delivery pipe 18 are shown in FIG. 1, any number of such sections may be utilized as desired to accommodate the necessary length of delivery. Further, only one section of coil and accompanying refractory is shown in FIG. 1, but it will be understood that any number of coil sections may be utilized, such as equivalent to the length of each pipe section 18a, 18b. The coil 36 is shown as being formed from a plurality of continuous turns 36a, etc., however, if desired a clam-shell coil construction (FIG. 4) may be utilized about the delivery pipe 18 wherein the halves 36x, 36y of each turn are removably connected together both by hose connections 35 for fluid transfer and electrical connections 37 for current transfer, and such connections are easily removable for removing and/or repairing the separate halves of the clam-shell like induction coil construction. Such clam shell construction is expected to make repair to refractories or moly easier and more expedient.

In operation, the cavity or space 32 is initially packed with cullet or tamp which will form a glass glaze on the outer peripheral surface of the delivery pipe 18 and protect it from oxidation, prior to the flow of molten glass within such cavity through slip joints 62. An inert purge gas, such as nitrogen, is initially utilized to remove oxygen from the cavity 32 and the surrounding refractory material. However, after glass has flown through the delivery pipe 18 and has seeped through the expansion joints 62 into the cavity 32, the various refractory joints are also sealed by the glass and the continued use of the purge gas is no longer required. The cavity 32 is of a minimum volume consistent with the thermal expansion, material fabrication and shims or supports 30 which hold the pipe 18 in spaced relationship within the cavity. As previously mentioned, the slip joints 62 are designed so that the cavity becomes filled with molten glass shortly after a throughput of glass flow from the outlet conduit 12 through the delivery pipe 18. The glass within the cavity 32 is contained and kept molten by means of the conducted heat through the pipe 18, but is stagnant because of the water cooled refractory flange assemblies 20a, 20b, and 20c. The thermal conditioning of the molten glass passing through the delivery pipe 18 is easily controlled since the pipe is inductively heated with electromagnetic fields that act with the speed of light, and the refractory metal pipe itself has very good thermal conductivity. Further, since the coils are water cooled and in intimate contact with a relatively thin refractory in close coupling with the refractory metal conduit 18, heat transfer rates several times that compared with the prior art can be achieved. Further, to prevent a large temperature channeling in the glass and provide for even temperature distribution between the core and the skin along the conduit 18, a static mixing device, such as shown in U.S. Pat. No. 4,365,987 may be utilized.

Although we have now disclosed the preferred embodiments of our invention, it will be apparent to those skilled in the art that various changes and modifications may be made thereto without departing from the spirit and scope of the invention as set forth in the following claims.

We claim:

1. A delivery and conditioning system for thermally conditioning thermoplastic material as it is delivered from a source of such material to a delivery station, which comprises:
   a delivery pipe for flowing thermoplastic material therethrough having an inlet end communicating with a source of thermoplastic material and an outlet end communicating with a desired delivery station;
   refractory materials surrounding said delivery pipe and extending longitudinally therealong;
   inductive heating means operatively engaging said refractory material and surrounding said delivery pipe in spaced-apart relation thereto for inductively heating said pipe, and through conduction, for heating the thermoplastic material therein;
   means for supplying power to said inductive heating means for controlling the thermal conditioning of the thermoplastic material within said delivery pipe;
   means for cooling said inductive heating means,
   said refractory material surrounding said delivery pipe being spaced-apart from an outer peripheral surface of said pipe so as to form a cavity between said outer surface and the refractory material;
   means for permitting a limiting ingress of thermoplastic material within said cavity from the flow thereof within said pipe; and
   means for sealing said cavity adjacent the inlet and outlet ends of said delivery pipe.

2. A delivery and conditioning system as defined in claim 1 wherein said delivery pipe is formed of a plurality of axially aligned pipe sections, and said means for permitting the limited engress of said thermoplastic material includes slip joint means for joining the ends of adjacent pipe sections together while permitting the thermal expansion and contraction of said pipe sections.

3. A delivery and conditioning system as defined in claim 1 wherein said means for sealing said cavity adjacent the inlet and outlet ends of said delivery pipe includes water-cooled flange assemblies abutting end portions of said refractory material and engaging outer peripherial portions of said delivery pipe for closing off and sealing end portions of said cavity.

4. A delivery and conditioning system as defined in claim 1 wherein said inductive heating means includes an induction heating coil having a plurality of turns helically wound about said delivery pipe and engaging said refractory material surrounding said pipe, and each of said turns being of a clam-shell construction having fluid transfer connections and electrical connections between the claim-shell halves.

5. Apparatus for conducting molten thermoplastic material from an inlet station to a delivery station while thermally conditioning the flow of such material passing therethrough, which comprises:
   refractory metal conduit means, having an inlet end communicating with a source of thermoplastic material and an outlet end communicating with a desired delivery station, for conducting the flow of thermoplastic material from the inlet end to the outlet end;

refractory material surrounding a longitudinally extending portion of said refractory metal conduit means;

means for spacing said refractory metal conduit means from said surrounding refractory material and for forming a cavity between said refractory material and an outer peripheral surface of said refractory metal conduit means;

means for permitting the thermoplastic material within said refractory metal conduit to flow a limited amount into said cavity formed between said refractory material and the outer peripheral surface of said refractory metal conduit means;

and means engaging portions of said refractory material for inductively heating said refractory metal conduit means and for thermally conditioning the thermoplastic material within said conduit means.

6. Apparatus for conducting molten thermoplastic material as defined in claim 5 wherein said means for permitting the limited flow of said thermoplastic material into said cavity includes slip joint means for connecting adjacent ends of conduit sections forming said refractory metal conduit means, and said slip joint means includes open communication passages between said cavity and the interior of said conduit sections for permitting thermoplastic material within said sections to flow into said cavity.

7. Apparatus for conducting molten thermoplastic material as defined in claim 5 wherein said means for inductively heating said refractory metal conduit means includes an easily removable induction heating coil having a plurality of turns wound about said conduit means, and said turns being of a clam-shell construction with adjacent halves thereof having fluid transfer connections and electrical connections.

8. A method of delivering thermoplastic material from a source thereof to a desired delivery station while thermally conditioning the thermoplastic material which comprises:

flowing molten thermoplastic material along a delivery path communicating at an inlet end with a source of such material and at an outlet end with a desired delivery station, surrounding the longitudinal extent of the delivery path with an inductively heatable material, inductively heating said inductively heatable material along the delivery path to heat the thermoplastic material flowing therealong while simultaneously applying cooling to the source of the inductive heating, surrounding the inductively heatable material with thermoplastic material exteriorly of said delivery path to protect the same, and regulating the heating and cooling so applied to thermally condition the thermoplastic material within said delivery path.

9. A method of delivering thermoplastic material as defined in claim 8 including the step of providing exterior member for absorbing unwanted inductively generated flux which is not directed toward said inductively heatable material surrounding said delivery path.

10. A method of delivering thermoplastic material as defined in claim 8 including the step of selectively applying inductive heating along longitudinal portions of said delivery path.

* * * * *